Patented July 18, 1950

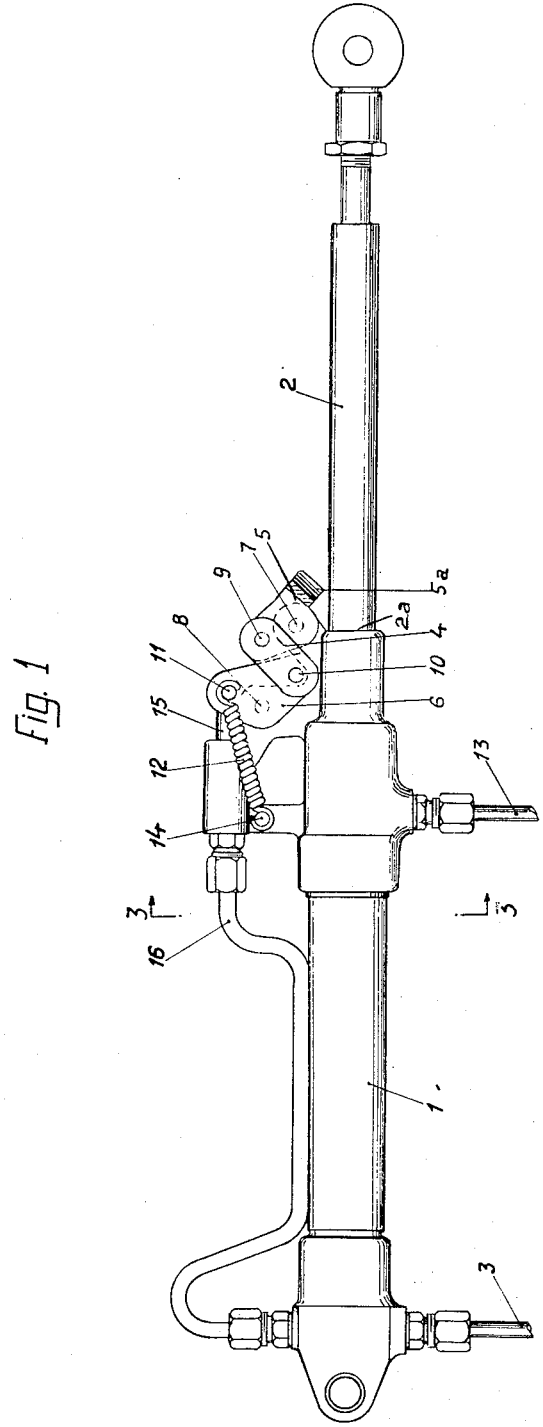

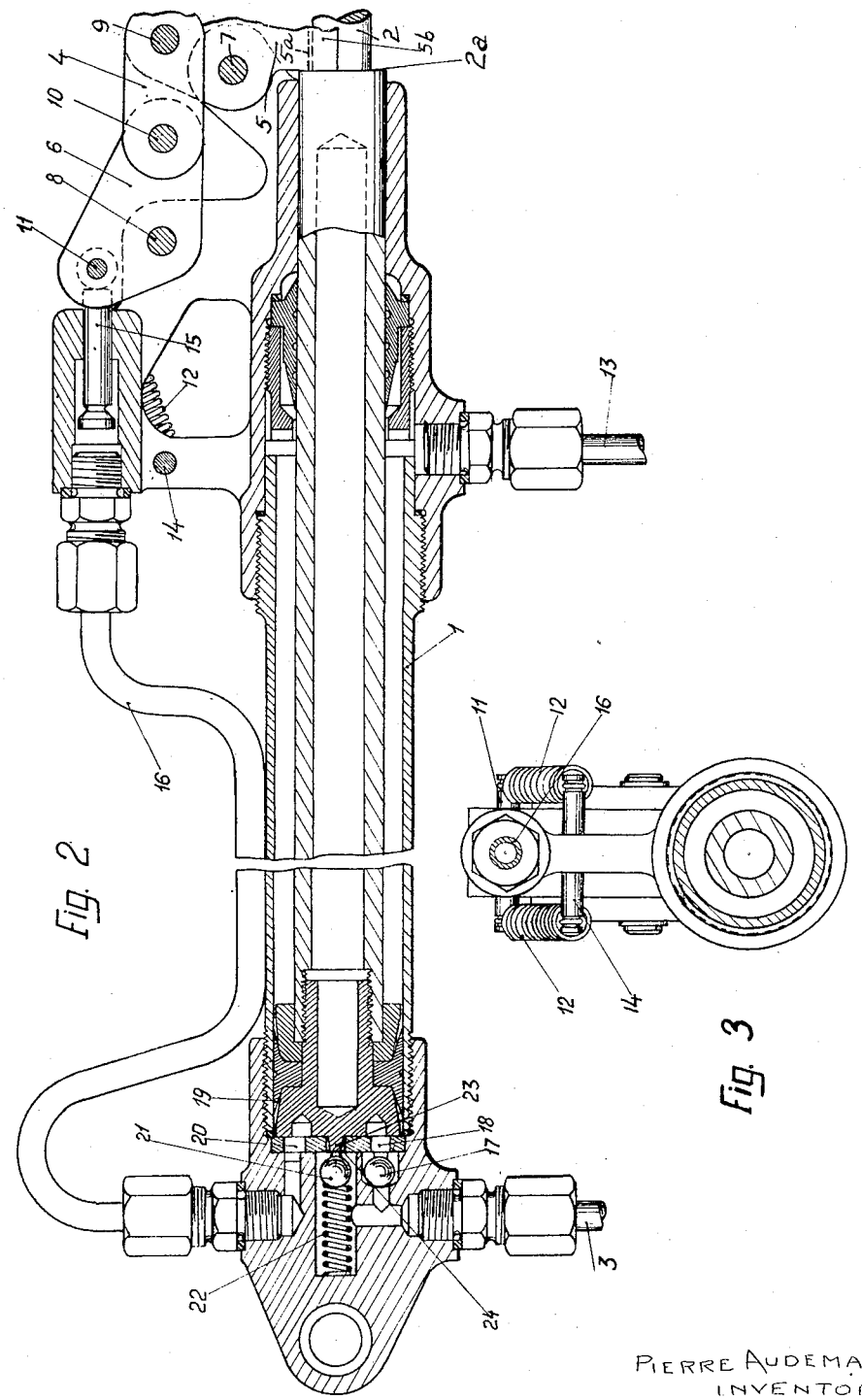

2,515,287

UNITED STATES PATENT OFFICE 2,515,287

LOCKING DEVICE FOR PRESSURE FLUID MOTORS

Pierre Audemar, La Garenne-Colombes, France, assignor to Olaer Patent Cy, Luxemburg (Duchy of Luxemburg), a company of Luxemburg, and Compagnie Generale pour l'Equipement Aeronautique, Paris, Seine, France, a company of France Application September 7, 1945, Serial No. 615,050
In France December 18, 1942

Section 1, Public Law 690, August 8, 1946
Patent expires December 18, 1962

1 Claim. (Cl. 121—40)

The present invention relates to locking devices for hydraulic jacks and the like.

The question is of considerable importance, especially in the case of hydraulic jacks utilized in connection with airplane landing gears. In this case, the locking must, on the one hand, be absolutely safe, in order, for instance, to prevent lowering of the landing gear in flight, and, on the other hand, permit as easy as possible an unlocking and avoid any risk of jamming which would prevent lowering of the gear when it is desired to land the airplane.

Up to the present time, all the locking devices that have been proposed included a part sliding in a direction perpendicular to that of the displacement of the member to be locked. It will be easily understood that if, for any reason whatever, the member to be locked tends to move before the locking part is fully retracted, it exerts thereon a violent thrust which produces jamming and tearing off of the metal of the locking member.

On the other hand, when the member to be locked, due to a temporary failing of the control device, does not get, during the retracting operation, its fully retracted position, a locking piece of the kind that slides perpendicularly to the direction of movement of the member to be locked runs the risk of never getting into locking position and the device may remain unlocked without the pilot being aware of this.

The object of the present invention is to provide a device which avoids all these drawbacks and ensures a safe and efficient locking.

The locking device according to the present invention comprises, in combination with a hydraulic cylinder having a piston movable therein and a piston rod for said piston, a lever pivoted to said cylinder about an axis perpendicular to the direction of sliding of said piston rod, said lever having a locking surface adapted to cooperate with a shoulder of said piston rod for holding it in locking position in which the locking surface is perpendicular to the longitudinal axis of said piston rod, the pivot of said lever being located substantially in the plane of said shoulder when said piston rod is in locking position, the circular arc described by each point of the outer end of said locking surface being tangential to the cylindrical surface of the piston rod at the beginning of the unlocking movement, and means to maintain said lever in the locking position in which said lever is perpendicular to the longitudinal axis of said piston rod. The lever therefore follows, for part of its movement, the movement of the piston rod to be locked, thus avoiding any risk of jamming and permits the parts to reach gradually locking position during the retracting movement of the piston rod to be locked, which piston rod is even pushed toward its locked position. Other features of the invention will appear from the following description taken in connection with the drawings forming a part of this specification, and in which:

Fig. 1 is an elevational view of a hydraulic jack fitted with a locking device according to the invention, this jack being shown in its unlocked position.

Fig. 2 is a vertical axial view of the jack of Fig. 1, shown in the locked position, and Fig. 3 is a section made on the line 3—3 of Fig. 1.

Referring to the drawing, 1 is the body of the jack and 2 the piston rod that slides inside this body. The jack is operated by a liquid under pressure, such for instance as oil, fed through a conduit 3 for expansion of the jack and through a conduit 13 for its retraction. The locking device is constituted by a lever 5 which forms the locking piece proper and a toggle 4—6. The end 5b of lever 5 has a locking surface 5a adapted to cooperate with a shoulder 2a on piston rod 2. Lever 6 pivots about a fixed axis 8 and lever 5 about a fixed axis 7 in such a manner that its end 5b describes, during locking and unlocking movement, a circular arc which is tangential to the cylindrical surface of piston rod 2. The ends of levers 5 and 6 are connected together by a link 4 pivoted at 9 and 10 to levers 5 and 6, respectively. A spring 12 is interposed between a fixed point 14 of the jack and a point 11 of lever 6. Control of the toggle is ensured through a small piston 15 actuated by oil under pressure fed through conduit 16.

Operation of this device takes place as follows:

In the locking position shown by Fig. 2, the lever 5 abuts with its locking surface 5a against the shoulder 2a of piston rod 2, said locking surface being perpendicular to the longitudinal axis of said piston rod, and the pivot point 10 of link 4 is located on a line passing through axis 8 of lever 6 and pivot 9 of link 4 or slightly above this line. Under these conditions, any action tending to produce expansion of the jack, that is to say to move lever 5 in a counterclockwise direction, is impossible. In order to start the movement of lever 5 in this direction, it is necessary first to bring pivot point 10 below this line of axis 8 and pivot 9, and as a matter of fact the efforts that would tend to produce expansion of the jack tend to push this pivot 10 in the opposite direction, that is to say above the said line. The jack is therefore perfectly well locked.

On the other hand, spring 12 also tends to keep pivot 10 on—or slightly above—the line passing through the axis 8 and pivot 9.

Unlocking can take place only when liquid under pressure is fed through pipe 16 to the small piston 15.

The liquid under pressure fed through conduit 3 opens check valve 17 and passes through orifice 18 into the cylinder 1 of the jack. This liquid under pressure then passes through orifice 20 into pipe 16 and pushes to the right piston 15 which acts on the lever 6 of the toggle. The latter is then broken, that is to say pivot point 10 is brought below the line passing through axis 8 and pivot 9. Simultaneously, piston rod 2 starts moving toward the right and the end 5b of lever 5, which constitutes the locking piece proper, follows, for part of its movement, this movement of the piston rod.

In order to retract rod 2, liquid under pressure is fed through conduit 13 in such manner as to push piston 19 toward the left and to retract rod 2. In the course of this movement, if no special precautions were taken, spring 12 would pull the knuckle toward the position shown by Fig. 2 and the fork formed by the lower portion of lever 5 would come to rub against rod 2. In order to avoid this, arrangement is made, according to the present invention, to keep the toggle in the position of Fig. 1 during the whole retracting of the jack. For this purpose, the liquid present in cylinder 1, on the left hand side of piston 19, is compelled, in order to escape through conduit 3, to raise a valve constituted by a ball 21 subjected to the action of a spring 22, which therefore produces a counter-pressure in the liquid in question. This counter-pressure is transmitted to the liquid present in pipe 16 and it pushes to the right piston 15 so as to keep the toggle in the position of Fig. 1. It is only at the end of the stroke of piston 19 that a push-piece 23 provided at the center of this piston, enters orifice 24 and pushes back check valve 21 so as to permit the liquid present in pipe 16 to flow out without counter-pressure. Rod 2 is now fully retracted and spring 12 causes locking to take place by bringing the toggle into the position of Fig. 2.

It is therefore clear that the locking device according to the invention never moves perpendicularly to the direction of displacement of the member to be locked as long as it is in contact therewith, which avoids any possibility of jamming. On the other hand, at the time of the retraction of the member to be locked, it accompanies the movement of the latter and exerts a thrust in the direction of its retraction.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claim.

What I claim is:

A locking device comprising, in combination with a hydraulic cylinder, a piston movable therein and a piston rod for said piston, a lever pivoted to said cylinder about an axis perpendicular to the direction of sliding of said piston rod, a shoulder provided on said piston rod, the pivot of said lever being located substantially in the plane of said shoulder when said piston rod is in locking position, said lever having a locking surface adapted to cooperate with said shoulder for holding said piston rod in locking position in which said locking surface is perpendicular to the longitudinal axis of said piston rod, the circular arc described by each point of the outer end of said locking surface being tangential to the cylindrical surface of said piston rod at the beginning of the unlocking movement, a toggle joint interposed between said cylinder and said lever for locking the latter in locking position, hydraulic motor means for bringing said toggle joint beyond the position in which said lever is released, a fluid connection between said cylinder and said hydraulic motor means, and a valve arrangement in said fluid connection operative to build up pressure in the connection at the initial stage of the extension and also during retraction of said piston rod.

PIERRE AUDEMAR.

REFERENCES CITED

The following references are of record in the file of this patent:

UNITED STATES PATENTS

| Number | Name | Date |
|---|---|---|
| 1,038,837 | Brinckerhoff | Sept. 17, 1912 |
| 1,583,189 | Scott | May 4, 1926 |
| 1,694,980 | Pearmain | Dec. 11, 1928 |